United States Patent
Mino et al.

[11] Patent Number: 6,099,958
[45] Date of Patent: Aug. 8, 2000

[54] LUBRICATING FILM COMPRISING A COVALENTLY BONDED, CHEMICALLY ADSORBED FILM AND A PHYSICALLY ADSORBED ORGANIC COMPOUND FORMED THEREON

[75] Inventors: Norihisa Mino, Setsu; Kazufumi Ogawa, Nara, both of Japan

[73] Assignee: Matsushita Electric Industrial Co., Ltd., Osaka, Japan

[21] Appl. No.: 08/970,293

[22] Filed: Nov. 14, 1997

Related U.S. Application Data

[63] Continuation of application No. 08/588,362, Aug. 14, 1995, abandoned, which is a continuation of application No. 08/098,050, Jul. 28, 1993, abandoned.

[30] Foreign Application Priority Data

Jul. 29, 1992 [JP] Japan ................................ 4-202646

[51] Int. Cl.⁷ .................................................. B32B 7/04
[52] U.S. Cl. .......................... 428/333; 428/447; 428/448
[58] Field of Search .................................... 428/333, 336, 428/447, 448, 910

[56] References Cited

U.S. PATENT DOCUMENTS

| | | | |
|---|---|---|---|
| 4,539,061 | 9/1985 | Sagiv | 156/278 |
| 4,583,145 | 4/1986 | Monnich | 360/135 |
| 4,673,474 | 6/1987 | Ogawa | 204/157.64 |
| 4,751,171 | 6/1988 | Ogawa | 430/299 |
| 5,011,963 | 4/1991 | Ogawa et al. | 556/485 |
| 5,030,521 | 7/1991 | Nishikawa et al. | 428/694 |
| 5,035,782 | 7/1991 | Tamura et al. | 204/157.6 |
| 5,114,737 | 5/1992 | Ogawa et al. | 427/36 |
| 5,209,976 | 5/1993 | Ogawa | 428/391 |
| 5,225,274 | 7/1993 | Ogawa et al. | 428/333 |
| 5,240,774 | 8/1993 | Ogawa et al. | 428/411.1 |

FOREIGN PATENT DOCUMENTS

| | | |
|---|---|---|
| 0 363 924 | 4/1990 | European Pat. Off. . |
| 0 426 440 | 5/1991 | European Pat. Off. . |
| 0 472 990 | 3/1992 | European Pat. Off. . |
| 0 491 251 | 6/1992 | European Pat. Off. . |
| 0 498 335 | 8/1992 | European Pat. Off. . |

*Primary Examiner*—D. S. Nakarani
*Attorney, Agent, or Firm*—Morrison & Foerster LLP

[57] ABSTRACT

A chemically adsorbed film comprising carbon-chain organic molecules is formed on a substrate surface via covalent bonds, and organic compounds comprising carbon chains are physically adsorbed to the surface of the chemically adsorbed film, thus providing a lubricating film which is thin and durable against friction, and with good anti-abrasion and sliding properties. The thickness of the lubricating film is at the nanometer level. More specifically, a lubricating film is made by forming a chemically adsorbed film on a substrate surface after dipping and holding the substrate in a nonaqueous solution dissolving chemical admolecules, and by coating a chloroform solution of a long-chain hydrocarbon-based fatty acid ester compound on the surface of the chemically adsorbed film.

7 Claims, 3 Drawing Sheets

LUBRICATING FILM COMPRISING A COVALENTLY BONDED, CHEMICALLY ADSORBED FILM AND A PHYSICALLY ADSORBED ORGANIC COMPOUND FORMED THEREON

This application is a continuation of application Ser. No. 08/588,362, filed Aug. 14, 1995, now abandoned, which is a continuation of application Ser. No. 08/098,050, filed Jul. 28, 1993, now abandoned.

FIELD OF THE INVENTION

The invention relates to the formation of a lubricated substrate surface requiring a lubricating property. More specifically, the invention relates to a lubricating film and method of manufacturing the same.

BACKGROUND OF THE INVENTION

Members with a lubricating property have been widely used recently. Slide members used in mechanical elements (shafts, bearings, cranks or the like) and recording members (magnetic tapes, magnetic discs, photo-electro magnetic discs, etc.) are examples of such members. A magnetic recording medium is mentioned in the following descriptions as an example of a conventional lubrication technology. Taking the place of coated magnetic recording media such as magnetic tape—in which a polyester film or the like is coated with solvent and a magnetic material such as ferrite powder—magnetic recording media with ferromagnetic metallic thin films formed on non-magnetic supports by a plating method, sputtering method, vacuum deposition method, ion plating method or the like have been in research as high density magnetic media.

For efficient operation, the magnetic recording medium located under the magnetic heads is required to run smoothly and stably at the stage of recording or playing magnetic signals even if the relative motion of the media to the heads is fast at such a stage.

Unfortunately, the high density magnetic media which are produced in the above-noted methods have poor anti-abrasion and running properties. Particularly, the ferromagnetic metallic thin film of the media produced in the above-noted methods cannot sustain rough conditions of the magnetic recording and playing processes. As a result, the media are likely to run with instability due to friction against the heads or the like, and the output of the media declines drastically because of abrasion and damage to the media or the generation of abrasion powder after running the media for many hours. Therefore, it has been required to apply a lubricating agent on the surfaces of magnetic recording media. In addition, in order to improve the recording density, it has been required to make the surfaces of the media as flat as possible. The surface roughness of the magnetic layer of a video tape currently has its center line average height around 0.02 micrometers; however, to further improve recording density of the magnetic recording media, the center line average height should be lowered by one digit. Contact area against the heads widens as the surface roughness of the media decreases, thus increasing the coefficient of friction. In this sense, an improved lubricating agent has been in demand.

Lubricating agents have been used for improving a running property and lowering the coefficient of friction of tapes, and the agents have been selected in consideration of the compatibility between the agents and binders, and of the mobility of a coating film. As a conventional lubricating agent, a long-chain hydrocarbon compound has been mainly used, and other kinds of lubricating agents are sometimes added to the agent (*Denki Zairyo No Trypology* by Realize Co., Ltd., p.185).

The conventional technology of lubricating ceramics, metals, resins, woods, inorganics, papers, fibers or the like is the same as the technology mentioned above.

There are solid and liquid conventional lubricating agents. The use of the solid lubricating agents, however, have been declining since it is difficult to coat the agents with a uniform thickness. The liquid lubricating agents, on the other hand, have been used for manufacturing lubricating films by spin-coating or dipping methods.

However, the thickness of the film formed by using the conventional liquid lubricating agents is at least five nanometers, and there is a limit on moving the medium close to the head. Therefore, the density and capacity of the medium is not likely to be improved. Although the lubricating film is needed especially for the convex surfaces of the magnetic recording medium to reduce the abrasion created by the friction between the head and the medium, the agent is likely to stay in the concave surfaces rather than on the convex surfaces. It is also difficult to control the supply of the liquid lubricating agent, and the agent is likely to scatter when a large quantity of it is supplied; as a result, reading and writing to magnetic records becomes difficult.

SUMMARY OF THE INVENTION

In order to solve the above-noted problems of conventional technologies, an objective of the invention is to manufacture a lubricating film with excellent endurance against sliding, and with good anti-abrasion, running and lubrication properties and a method of manufacturing the same in which a lubricating film is formed by building up a uniformly thin, chemically adsorbed film with a thickness at the nanometer level.

In order to accomplish the above objective, the lubricating film of the invention is composed of a chemically adsorbed film comprising carbon-chain organic molecules covalently bonded to at least one substrate surface and organic compounds comprising carbon chains physically adsorbed to the surface of the chemically adsorbed film.

It is preferable that the carbon-chain organic molecule has fluorocarbon groups at the end of the molecule.

It is preferable that the number of carbon atoms of the carbon-chain organic molecule is between 8 and 30.

It is preferable that the organic compound physically adsorbed to the chemically adsorbed film is at least one compound selected from the group consisting of a long-chain hydrocarbon-based fatty acid, fatty acid ester, silicon derivative, fatty acid salt, and fatty acid amide.

It is preferable that the substrate is at least one material selected from the group consisting of ceramics, metals, resins, wood materials, inorganics, papers, fibers, and information recording mediums. In case the substrate surface is incapable of forming covalent bonds or deficient in forming the bonds, the quality of the surface should be changed to enable bonds to form more easily.

It is preferable that the covalent bond is formed with atoms selected from the group consisting of oxygen, sulfur, nitrogen, silicon, titanium and tin.

It is preferable that the carbon-chain organic molecule comprises side chains.

It is preferable that the carbon-chain organic molecule comprises a mixture of at least two kinds of molecules.

A method of manufacturing a lubricating film according to the invention comprises the following procedures:

contacting a compound comprising carbon-chain organic molecules to at least one substrate surface, thus generating a low molecule elimination reaction and forming a chemically adsorbed film; and coating an organic compound comprising carbon chains on the surface of the chemically adsorbed film, thus physically adsorbing the compound to the surface.

It is preferable that the chemically adsorbed film is formed by removing unreacted compound after generating the low molecule elimination reaction between the substrate surface and the compound comprising carbon-chain organic molecules.

It is preferable that the compound comprising carbon-chain organic molecules is a compound whose molecular end is at least one group selected from the group consisting of a halogenated silyl group, halogenated titanyl group, halogenated stanyl group, and thiol group.

It is preferable that the compound comprising carbon-chain organic molecules has a fluorocarbon group at one end of its molecule.

It is preferable that the compound comprising the carbon-chain organic molecules is contacted to the substrate surface by dipping and holding the substrate in a solution containing the compound, or exposing the substrate to vapor containing the compound.

It is preferable that the compound comprising carbon-chain organic molecules is contacted to the substrate surface in an atmosphere below 35% relative humidity.

It is preferable that the organic solvent used for removing the unreacted compound comprising carbon-chain organic molecules is a nonaqueous solvent.

It is preferable that substrates in which active hydrogens can be exposed to the substrate surface are used. In case the substrate has no exposed active hydrogen on its surface, the surface is treated beforehand to provide exposed active hydrogens. As an example of increasing the number of exposed active hydrogens, the substrate surface can be treated with a silane compound comprising at least three Cl groups, such as tetrachlorosilane, trichlorosilane and $SiCl_3(OSiCl_2)_nOSiCl_3$ (where n represents 0 and a positive integer).

It is preferable that the active hydrogens are those of hydroxyl groups, amino groups, imino groups, carboxyl groups, thiol groups, alpha positions of carbonyl groups, alpha positions of cyano groups, alpha positions of nitro groups, alpha positions of double bonds, benzylic positions, sulfonic acid groups, sulfinic acid groups and phosphoric acid groups.

Based on the above-noted compositions of the invention, an ultra thin lubricating film with a uniform thickness at the nanometer level, having excellent endurance against sliding, and with good anti-abrasion, running and lubrication properties can be formed on the surface of members without reducing the original functions of the members. The lubricating film can be formed by physically adsorbing organic compounds comprising carbon chains to the surface of a chemically adsorbed film, which is formed previously on at least one substrate surface via covalent bonds.

According to a method of the invention, the above-noted lubricating film can be formed efficiently.

In addition, at least one substrate surface is formed with a chemically adsorbed film by chemically bonding long-chain molecules to the surface via siloxane bonds, and the surface of the chemically adsorbed film is further applied with a layer of organic compounds (physically adsorbed film), thus providing a lubricating film of the invention. Therefore, for example, the chemically adsorbed film cannot be abraded by friction against a member while a magnetic recording medium such as a magnetic head, magnetic tape or the like is running. The excellent endurance, running and anti-abrasion properties of the medium can be maintained for a long period. Even if the chemically adsorbed film is abraded, the layer of organic compounds (physically adsorbed film) applied to the chemically adsorbed film can cover the abraded section of the film. In addition, this lubricating film can be applied not only to recording media but to all types of slide members.

DETAILED DESCRIPTION OF THE INVENTION

A chemically adsorbed film is formed by a de-halogenation reaction between the active hydrogens of hydroxyl groups, amino groups, imino groups, carboxyl groups, thiol groups, alpha positions of carbonyl groups, alpha positions of cyano groups, alpha positions of nitro groups, alpha positions of double bonds, benzylic positions, sulfonic acid groups, sulfinic acid groups and phosphoric acid groups, and the halogens of halogenated silane groups, halogenated titanium groups, halogenated stanyl groups or the like of the chemical admolecules. Or alternatively, the film is formed by a coordinate bonding between metals on a substrate surface and the silanol groups of chemical admolecules. The thickness of the chemically adsorbed film is uniform, and can be controlled by changing the number of hydrocarbon groups constituting the film. When the number of hydrocarbon groups is 20, the thickness of the film is about 2.5 nanometers according to an ellipsometric method and X-ray photoelectric system (XPS). The orientation of the molecules of the film can be inferred from measuring the contact angles. For example, in case of a chemically adsorbed film comprising trifluorocarbon groups at the end of molecules, the surface energy of the film was significantly low (15 millinewton/meter), thus indicating the deposition of the trifluorocarbon groups on the surface of the film and showing good orientation of the molecules of the film.

Ceramics, metals, resins, woods and fibers contain active hydrogens on their surfaces and can be used as a substrate of the invention. The invention is not restricted by the shape of the substrates since the substrates are treated by a gaseous phase reaction or a dipping and holding reaction. Moreover, the chemically adsorbed film formed on the substrate surface is transparent, thereby not reducing the gloss, tone and like qualities of the substrate.

It is preferable that the organic compound applied to the surface of the chemically adsorbed film is at least one compound selected from the group consisting of long-chain hydrocarbon-based fatty acids, fatty acid esters, silicon derivatives, fatty acid salts and fatty acid amides.

In employing a magnetic recording medium as a substrate, a chemically adsorbed film is chemically bonded to at least one side of the medium via oxygen, sulfur and nitrogen atoms, and a layer of organic compounds (physically adsorbed film) is also coated on the surface of the chemically adsorbed film, thus providing a lubricating film of the invention. As a result, the lubricating film cannot be abraded by the friction against the slide member (e.g., magnetic head of the medium) and other members while the medium is running. Therefore, the lubricating film formed on the medium has excellent endurance against sliding, with good running, anti-abrasion and lubrication properties. The thickness of the film, in addition, is at the nanometer level and does not reduce the original functions of the members.

A low molecule elimination reaction means a dehydrochlorination reaction, dehydration reaction or the like. The invention is described by reference to the following examples.

EXAMPLE 1

A substrate 1 (magnetic recording medium) was provided by the following procedures:

shaping a polyethylene terephthalate film into a disk;

applying a high molecular binder filled with iron oxide powder (ferrite) or the like to the surface of the above-noted film;

compressing the film to make it highly dense, thus providing substrate 1.

A thin film of silicon oxide was formed on the substrate surface, containing hydroxyl groups with numerous active hydrogens on the surface exposed for adsorption.

As a next step, a solution used for forming a chemically adsorbed film was prepared by dissolving $CF_3(CH_2)_{18}SiCl_3$—chemical admolecules having trifluorocarbon groups at one end and trichlorosilyl groups at another end of the long-chain alkyl groups—into Freon-113 at a concentration of 1 millimol/liter in a dry atmosphere. The preparation of the solution was carried out in a glove box, containing nitrogen gas, with 5% or less relative humidity.

Substrate 1 was dipped and held in the prepared solution for one hour at 23° C. in a dry atmosphere. After concomitant loss of HCl, the admolecules became adsorbed onto the substrate, thus forming a monomolecular film. The adsorbed film and substrate are shown in Formula 1.

Formula 1

Unreacted chemical admolecules were removed from the substrate by the following procedure:

dipping and holding the substrate in Freon-113 for 20 minutes;

repeating the above step;

placing the substrate in a dry atmosphere and vaporizing Freon-113.

The substrate was then washed with flowing extra-pure water for 15 minutes. As a result, the SiCl groups of Formula 1 reacted to the SiCl groups of the neighboring chemical admolecules, thus forming a film shown in Formula 2. Formula 2 shows the correlation between three chemical admolecules and the substrate.

Formula 2

Figure 1:
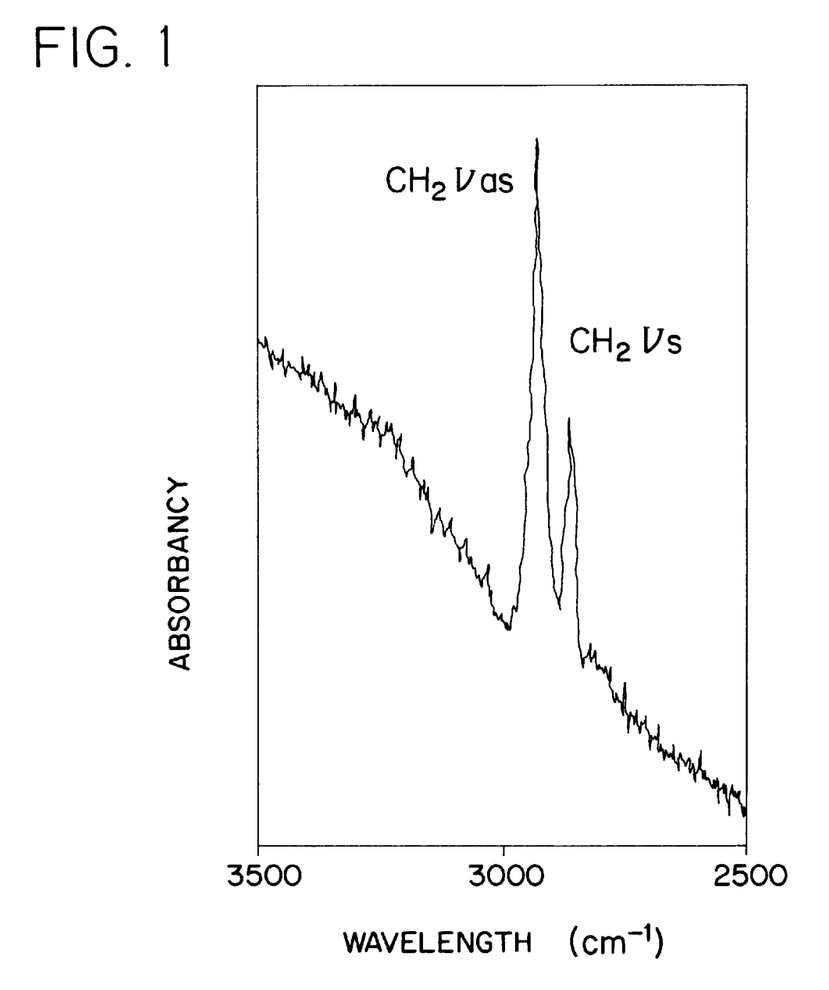
FIG. 1 is an infrared absorption spectrum of a chemically adsorbed film on a substrate surface.

FIG. 1 shows a portion of a Fourier transform infrared absorption spectrum of the substrate after the above-noted treatments, particularly indicating the antisymmetric stretching vibration (2930 cm$^{-1}$) and symmetric stretching vibration (2860 cm$^{-1}$) of methylene groups. The spectrum indicates that a chemically adsorbed film 2 was formed on the surface of substrate 1. The spectral intensity ratio of the antisymmetric stretching vibration to the symmetric stretching vibration is 2:1, thus showing the formation of a chemically adsorbed film in which molecules are oriented in the same direction.

Figure 2:
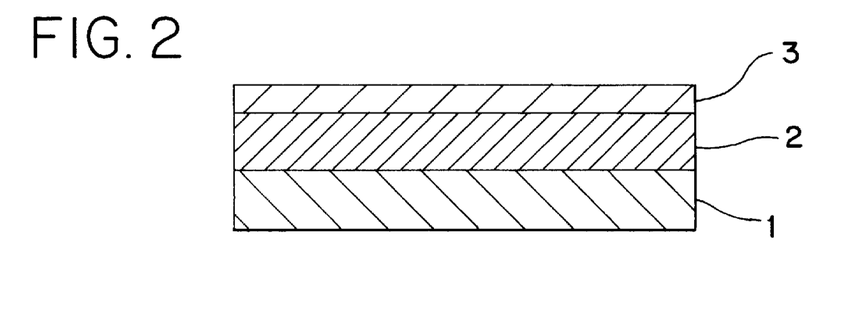
FIG. 2 is a cross-sectional view of a lubricating film.

Furthermore, the substrate was dipped and held in Freon-113 solution, dissolving $CH_3(CH_2)_{17}COOCH_3$ at a concentration of 1.0 gram/liter. Both the dipping and lifting speed was 1.5 mm/second. As a result, a thin film 3 (about 1 nanometer) of long-chain hydrocarbon fatty acid ester was formed on the surface of the chemically adsorbed film in a clean room atmosphere, thus forming a lubricating film of the example. Thin film 3 was physically adsorbed to the surface, and the cross sectional view of the lubricating film is shown in FIG. 2.

Figure 3:
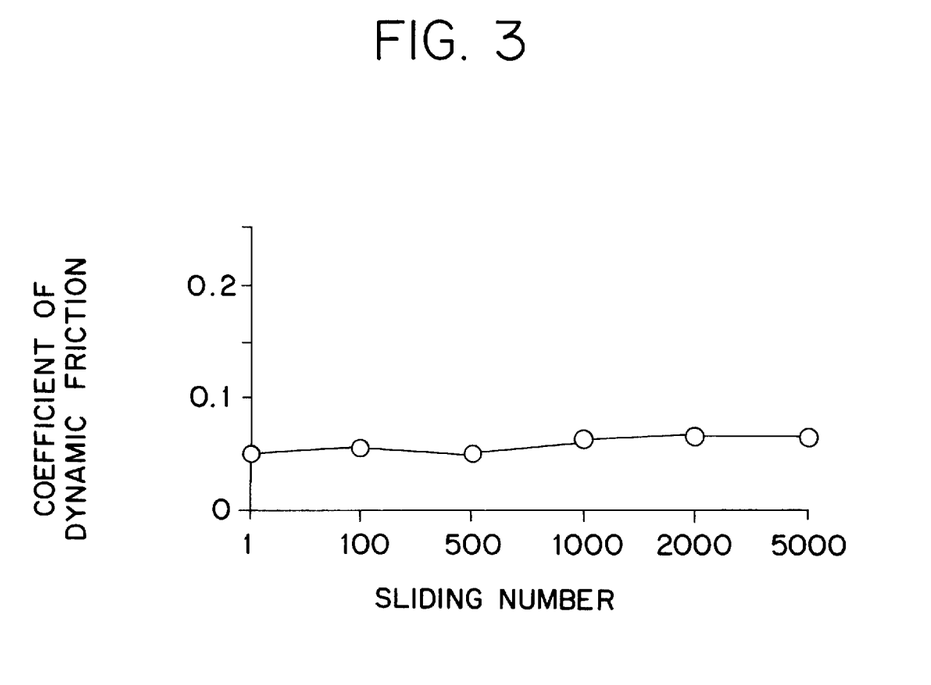
FIG. 3 shows the results of a sliding test of the example according to the invention.

A sliding test was directed to the substrate formed with the lubricating film. A steel ball, which weighted 100 grams, was slid on the substrate in a range of 10 cm. FIG. 3 is a graph where sliding number (X-axis) is plotted as a function of the coefficient of dynamic friction (Y-axis). According to the figure, even though the sliding number is increased, the coefficient of dynamic friction remains the same, thus showing the effect of a durable lubricating film on the substrate surface. After forming a lubricating film of the example on the surface of a magnetic recording disc, a CSS test—the test of repeatedly starting and stopping the disc—was performed on the disc placed under a magnetic head. According to the test result, 200,000 repetitions of starting and stopping were cleared by the disc.

EXAMPLE 2

A substrate was prepared in the following procedures:

shaping a polyimide film like a disc;

applying a high molecular binder filled with iron oxide powder (ferrite) or the like to the surface of the film; and compressing the above-noted film to make it highly dense, thus providing the substrate.

A thin film of silicon oxide was formed on the substrate surface, containing hydroxyl groups with numerous active hydrogens on the surface exposed for adsorption.

A solution for forming a chemically adsorbed film was prepared by dissolving $CF_3(CH_2)_{18}SiCl_3$—chemical admolecules having trifluorocarbon groups at one end and trichlorosilyl groups at another end of long-chain alkyl groups—into chloroform at a concentration of 1 millimol/liter in a dry atmosphere. The preparation of the solution was carried out in a glove box, containing nitrogen gas, with 5% or less relative humidity.

As a next step, ultrasonic vibration and heat was provided to the above-noted solution, thus turning the solution into fine grain particles and a gaseous body. The substrate was then exposed to the gaseous phase atmosphere of the solution for one hour in a dry atmosphere. The above-noted gaseous phase adsorption treatment was carried out in a dry atmosphere. Due to the above-noted gaseous-phase adsorption treatment, the chemical admolecules became bound to the substrate surface, as shown in Formula 3, by the dehydrochlorination reaction between the admolecules and the hydroxyl groups.

Formula 3

Unreacted chemical admolecules were removed from the substrate surface by the following procedure:

dipping and holding the substrate in chloroform for 20 minutes;

repeating the above step; and placing the substrate in a dry atmosphere and vaporizing chloroform in the atmosphere.

The substrate was then washed with flowing extra-pure water for 15 minutes, thus forming a chemically adsorbed film as shown in Formula 4 due to the reaction between the SiCl groups of Formula 3 and the SiCl groups of the neighboring chemical admolecules. Formula 4 shows the correlation between three chemical admolecules and the substrate.

Formula 4

The Fourier transform infrared absorption spectrum of the substrate formed with the film of the example was the same as FIG. 1, thus showing the formation of a chemically adsorbed film in which molecules were oriented in the same direction on the substrate surface.

Moreover, the substrate was dipped and held in a chloroform solution dissolving $CH_3(CH_2)_{17}COOCH_3$ at a concentration of 1.0 gram/liter, and both the dipping and lifting speed was 1.5 mm/second. As a result, a thin film (about 1 nanometer) of long-chain hydrocarbon-based fatty acid ester was physically adsorbed to the surface of the chemically adsorbed film in a clean room atmosphere, thus forming a lubricating film of the example. The cross sectional view of the lubricating film is the same as FIG. 2.

A sliding test was directed to the substrate surface formed with the lubricating film. Even though the sliding number was increased, the coefficient of dynamic friction remained the same, thus showing the effect of a durable lubricating film on the substrate surface. After forming a lubricating film of the example on the surface of a magnetic recording disc, a CSS test was directed to the disc. According to the test results, 200,000 repetitions of starting and stopping were cleared by the disc.

EXAMPLE 3

A substrate was prepared in the following procedures:

shaping a polyethylene terephthalate film like a disk;

applying a high molecular binder filled with iron oxide powder (ferrite) or the like to the film; and compressing the film to make it highly dense, thus providing the substrate.

A thin film of silicon oxide was formed on the substrate surface, containing hydroxyl groups with numerous active hydrogens on the surface exposed for adsorption.

A solution was prepared by dissolving $CF_3(CH_2)_{18}SiCl_3$—chemical admolecules having trifluorocarbon groups at one end and trichlorosilyl group at another end of long-chain alkyl groups—into a mixed solvent of 80% by weight of hexadecane, 12% by weight of carbon tetrachloride and 8% by weight of chloroform at a concentration of 1 millimol/liter. The preparation of the solution was carried out in a dry atmosphere. More specifically, the solution was prepared in a glove box, containing nitrogen gas, with 5% or less relative humidity.

The substrate was then dipped and held in the prepared solution for one hour at 23° C. in a dry atmosphere. As a result, the chemical admolecules became bound to the substrate surface, as shown in Formula 5, due to the dehydrochlorination reaction between the admolecules and the hydroxyl groups.

Formula 5

The substrate was placed in a dry atmosphere, and the solution was removed from the substrate surface in the atmosphere.

The substrate surface was then washed with flowing extra-pure water for 15 minutes; as a result, the SiCl groups of Formula 5 were reacted to the SiCl groups of the neighboring chemical admolecules or with the physically adsorbed chemical admolecules. Instead of chemically adsorbed films of Examples 1 and 2, a chemically adsorbed film composed of intertwined molecular chains was formed in this example.

The substrate was then dipped and held in a chloroform solution containing $CH_3(CH_2)_{17}COOCH_3$ at a concentration of 1.0 gram/liter. Both the dipping and lifting speed was 1.5 mm/second. A thin film (about 1 nanometer) of long-chain hydrocarbon-based fatty acid ester was formed on the surface of the chemically adsorbed film in a clean room atmosphere, thus forming a lubricating film of the example. A CSS test was directed to the magnetic recording disc formed with the lubricating film, and 200,000 repetitions of starting and stopping were cleared by the disc.

EXAMPLE 4

A gold thin film was deposited on the surface of a glass, thus providing a substrate of the example. Gold atoms were exposed to the surface of the thin film.

A solution by dissolving $CF_3(CH_2)_{18}SH$—chemical admolecules having trifluorocarbon groups at one end and thiol groups at another end of long-chain alkyl groups—into chloroform at a concentration of 1 millimol/liter in a dry atmosphere. More specifically, the preparation of the solution was carried out in a glove box containing nitrogen gas with 5% or less relative humidity.

The substrate was then dipped and held in the prepared solution for one hour at 23° C. in a dry atmosphere. As a result, a chemically adsorbed film shown in Formula 6 was formed due to the dehydrochlorination reaction between the chemical admolecules and the hydroxyl groups on the substrate surface.

Formula 6

$CF_3(CH_2)_{18}S$-substrate

Unreacted chemical admolecules were removed from the substrate surface by the following procedure:

dipping and holding the substrate in chloroform for twenty minutes;

repeating the above step;

placing the substrate in the dry atmosphere and vaporizing chloroform in the atmosphere.

The formation of a chemically adsorbed film, in which molecules were orientated in the same direction, was proven by obtaining the same Fourier transform infrared absorption spectrum as in FIG. 1.

The substrate was then dipped and held in a chloroform solution, dissolving $CH_3(CH_2)_{17}COOCH_3$ at a concentration of 1.0 gram/liter. Both the dipping and lifting speed was 1.5 mm/second. As a result, a thin film (about 1 nanometer) of long-chain hydrocarbon-based fatty acid ester was formed on the surface of the chemically adsorbed film in a clean room atmosphere, thus providing a lubricating film of the example. According to the sliding test result, the coefficient of dynamic friction of the film remained the same even though the sliding number was increased, thus showing the effect of a durable lubricating thin film on the substrate surface.

EXAMPLE 5

Figure 4:
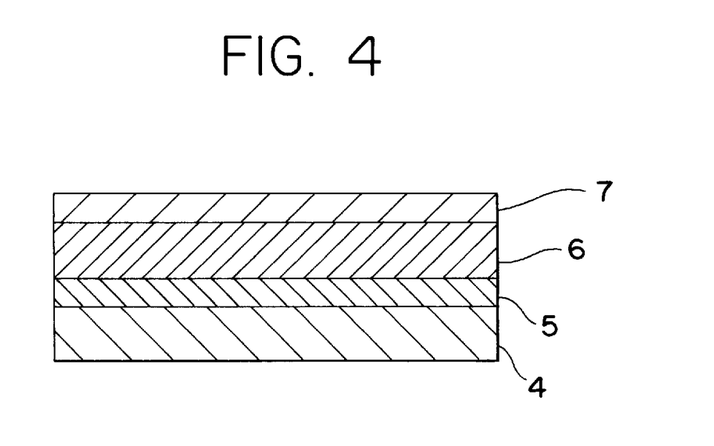
FIG. 4 is a cross-sectional view of a lubricating film on a stainless steel substrate.

The number of hydroxyl groups of a stainless steel (SUS) substrate 4 was increased.

A solution was prepared by dissolving tetrachlorosilane ($SiCl_4$) into the mixed solvent of 80% by weight of hexadecane, 12% by weight of carbon tetrachloride and 8% by weight of chloroform at a concentration of 1 millimol/liter. Substrate 4 was dipped and held in the prepared solution for one hour at 23° C. in a dry atmosphere. As a result, a thin film 5 comprising siloxane bonds was formed on the surface of substrate 4. The number of exposed hydroxyl groups was increased threefold from the number of those before the above-noted treatment.

The following procedures are the same as in Example 1. A chemically adsorbed film 6 was formed on the surface of substrate 4. A thin film 7 of long-chain hydrocarbon-based fatty acid was formed on the chemically adsorbed film, thus providing a lubricating film of the example. The same test of Example 1 was directed to the substrate formed with the lubricating film. The coefficient of dynamic friction was 0.1 after 5,000 sliding tests.

EXAMPLE 6

A high molecular binder filled with iron oxide powder was shaped like a disc, and formed with a thin film of silicon oxide, thus providing a substrate of the example, having hydroxyl groups with numerous active hydrogens on the substrate exposed for adsorption.

A solution used for forming a chemically adsorbed film was prepared by dissolving chemical admolecules—$CF_3(CF_2)_6(CH_2)_3SiCl_3$, having numerous fluorocarbon groups at one end and trichlorosilyl groups at another end of long-chain alkyl groups, and $CH_3(CH_2)_{18}SiCl_3$, having methyl groups at one end and trichlorosilyl groups at another end of long-chain alkyl groups—into the mixed solvent of 80% by weight of hexadecane, 12% by weight of carbon tetrachloride and 8% by weight of chloroform at a concentration of 1 millimol/liter. The preparation of the solution was carried out in a glove box, containing nitrogen gas, with 5% or less relative humidity.

The substrate was dipped and held in the prepared solution for one hour at 23° C. in a dry atmosphere. As a result, the chemical admolecules became bound to the substrate surface, as shown in Formula 7 and Formula 8, due to the dehydrochlorination reaction between the admolecules and the hydroxyl groups on the substrate surface, thus forming a chemically adsorbed film in which two kinds of chemical admolecules were included.

Formula 7

Formula 8

Unreacted chemical admolecules were removed from the substrate surface by the following procedure:

dipping and holding the substrate in chloroform for 20 minutes;

repeating the above step; and placing the substrate in a dry atmosphere and vaporizing chloroform in the atmosphere.

The substrate surface was then washed with flowing extra-pure water for 15 minutes. As a result, a film of Formula 9 was formed on the surface due to the reaction between the SiCl groups of Formulas 7 and 8, and the SiCl groups of the neighboring chemical admolecules.

Formula 9

The substrate was then dipped and held in a chloroform solution dissolving $CH_3(CH_2)_{17}COOCH_3$ at a concentration of 1.0 gram/liter, and both the dipping and lifting speed was 1.5 mm/second. A thin film (about 1 nanometer) of long-chain hydrocarbon-based fatty acid ester was then formed on the surface of the chemically adsorbed film in a clean room atmosphere, thus providing a lubricating film of the example. A CSS test was directed to a magnetic recording disc after forming a lubricating film of the example on the disc. According to the test result, 200,000 repetitions of starting and stopping were cleared by the disc.

EXAMPLE 7

A high molecular binder filled with iron oxide powder was shaped like a disc, and formed with a thin film of silicon oxide, thus providing a substrate of the example, having hydroxyl groups with numerous active hydrogens on the surface exposed for adsorption.

An admolecule constituting a chemically adsorbed film of the example is shown in the following Formula 10. The admolecule has numerous fluorocarbon groups at the end of long-chain alkyl groups, methyl groups at the end of side chains and trichlorosilyl groups at another end of long-chain alkyl groups.

Formula 10

A solution was prepared by dissolving the above-noted admolecules into the mixed solvent of 80% by weight of hexadecane, 12% by weight of carbon tetrachloride and 8% by weight of chloroform at a concentration of 1 millimol/liter in a dry atmosphere. More specifically, the solution was prepared in a glove box containing nitrogen gas with 5% or less relative humidity.

The substrate was then dipped and held in the prepared solution for one hour at 23° C. in a dry atmosphere. A chemically adsorbed film shown in Formula 11 was formed on the substrate surface due to the dehydrochlorination reaction between the chemical admolecules and the hydroxyl groups on the surface.

Formula 11

Unreacted chemical admolecules were removed from the substrate surface by the following procedure:

dipping and holding the substrate in chloroform for 20 minutes;

repeating the above step; and placing the substrate in a dry atmosphere and vaporizing chloroform in the atmosphere.

The substrate was then washed with flowing extra-pure water for 15 minutes. As a result, a film shown in Formula 12 was formed due to the reaction between the SiCl groups of Formula 11 and the SiCl groups of the neighboring chemical admolecules.

Formula 12

The substrate was dipped and held in a chloroform solution dissolving $CH_3(CH_2)_{17}COOCH_3$ at a concentration of 1.0 gram/liter, and both the dipping and lifting speed was 1.5 mm/second. Finally, a thin film (about 1 nanometer) of long-chain hydrocarbon-based fatty acid was formed on the surface of the chemically adsorbed film in a clean room atmosphere, thus providing a lubricating film of the example. A CSS test was directed to a magnetic recording disc formed with a lubricating film of the example, and 200,000 repetitions of starting and stopping were cleared by the disc.

EXAMPLE 8

A high molecular binder filled with iron oxide powder was shaped like a disc, and formed with a thin film of silicon oxide, thus providing a substrate of the example, having hydroxyl groups with numerous active hydrogens on the surface exposed for adsorption.

As chemical admolecules constituting a chemically adsorbed film, the admolecules in Formula 13—having numerous fluorocarbon groups at one end of long-chain alkyl groups, methyl groups at the end of side chains and trichlorosilyl groups at another end of the long-chain alkyl groups—were used.

Formula 13

A solution was prepared by dissolving the above-noted chemical admolecules into the mixed solvent of 80% by weight of hexadecane, 12% by weight of carbon tetrachloride and 8% by weight of chloroform at a concentration of 1 millimol/liter in a dry atmosphere. More specifically, the preparation of the solution was carried out in a glove box, containing nitrogen gas, with 5% or less relative humidity.

The substrate was then dipped and held in the prepared solution for one hour at 23° C. in a dry atmosphere. A chemically adsorbed film of Formula 14 was formed on the substrate due to the dehydrochlorination reaction between the chemical admolecules and the hydroxyl groups on the substrate surface.

Formula 14

Unreacted chemical admolecules were removed from the substrate surface by the following procedure:

dipping and holding the substrate in chloroform for 20 minutes;

repeating the above step; and placing the substrate in a dry atmosphere and vaporizing chloroform in the atmosphere.

The substrate was then washed with flowing extra-pure water for 15 minutes. As a result, a film of Formula 15 was formed due to the reaction between the SiCl groups of Formula 14 and the SiCl groups of the neighboring chemical admolecules.

Formula 15

The substrate was then dipped and held in a chloroform solution dissolving $CH_3(CH_2)_{17}COOCH_3$ at a concentration of 1.0 gram/liter, and both the dipping and lifting speed was 1.5 mm/second. A thin film (about 1 nanometer) of long-chain hydrocarbon-based fatty acid was formed on the surface of the chemically adsorbed film in a clean room atmosphere, thus providing a lubricating film of the example. A CSS test was directed to a magnetic recording disc formed with a lubricating film of the example, and 200,000 repetitions of starting and stopping were cleared by the disc.

EXAMPLE 9

An experiment similar to Example 6 was conducted in this example, except that the chemical admolecules were replaced with the chemical admolecules of Formulas 6 and 7. A CSS test was directed to a magnetic recording disc formed with a lubricating film of the example, and 200,000 repetitions of starting and stopping were cleared by the disc.

Formula 16

Formula 17

EXAMPLE 10

An experiment similar to Example 7 was conducted in this example, except that the chemical admolecules were replaced with the chemical admolecules of Formula 18. A CSS test was directed to a magnetic recording disc formed with a lubricating film of the example, and 200,000 repetitions of starting and stopping were cleared by the disc.

Formula 18

EXAMPLE 11

An experiment similar to Example 8 was conducted in this example, except that the chemical admolecules were replaced with the chemical admolecules of Formula 19. A CSS test was directed to a magnetic recording disc formed with a lubricating film of the example, and 200,000 repetitions of starting and stopping were cleared by the disc.

Formula 19

EXAMPLE 12

Figure 5:
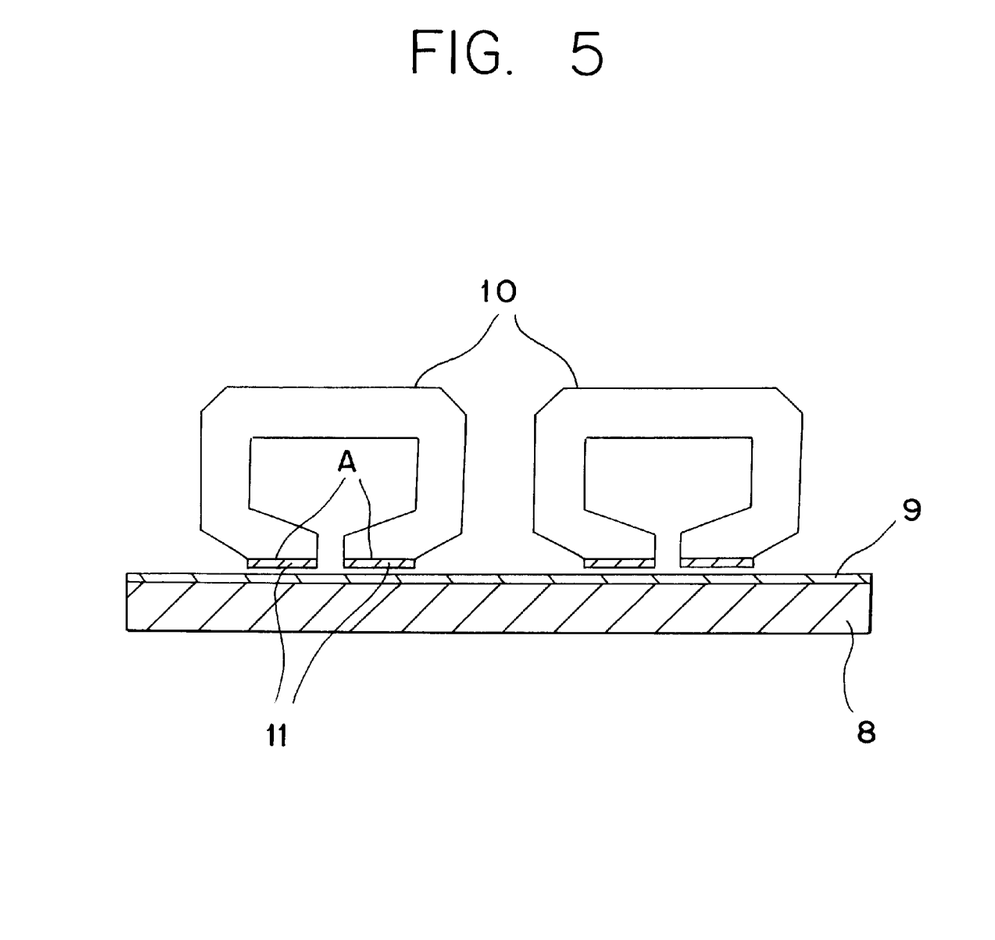
FIG. 5 shows a basic model of a magnetic recording medium.

By applying the procedures of Example 1, a lubricating film 9 composed of two chemically adsorbed films was formed on the surface of a magnetic recording medium 8. Similarly, by applying the procedures of Example 1, a lubricating film 11 was formed on the surface of a sliding part A of a magnetic head 10. A magnetic recording system was assembled by combining the magnetic recording medium and the magnetic head. In case the density of the chemically adsorbed film of this example is low, a chemically adsorbed film can be formed by following the procedures of Example 5. The procedures of forming a chemically adsorbed film shown in Examples 6–11 can also be applied to this example if necessary. A magnetic recording system was used in this example; however, the invention is applicable to other kinds of sliding parts.

EXAMPLE 13

By applying a semiconductor manufacturing process to the example, a wheel at a micron level was formed on the surface of a silicon substrate. The procedures of Example 1 were again followed in this example to form a lubricating film on the surface of the wheel. Due to the lubricating film of the invention, the sliding between the wheel and an axle and also between wheels became smooth, thereby providing smooth rotation of the wheel and reducing the irregularity of the process.

In the examples mentioned above, a lubricating film was used only for a recording medium. However, a lubricating film of the invention can be applied to other recording mediums—such as a hard disc, magnetic tape, magnetic card, photo-electro magnetic disc and memory card—and sliding parts including a crank, shaft, bearing and micromechanics.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A lubricating film comprising:

a chemically adsorbed monomolecular film comprising organic molecules covalently bonded to a substrate surface, wherein the number of carbon atoms of said organic molecules is between 8 and 30, and a layer of physically adsorbed organic compounds comprising carbon chains physically adsorbed to the surface of said chemically adsorbed monomolecular film, said physically adsorbed organic compounds comprising at least one compound selected from the group consisting of hydrocarbon-based fatty acids, fatty acid esters, silicon derivatives having Si and an alkyl group in a part of a structure, fatty acid salts, and fatty acid amides;

wherein a surface of the substrate coated with said lubricating film has sufficient durability that said lubricating film will endure 5,000 repetitions of sliding a 100 gm steel ball on the substrate in a range of 10 cm.

2. A lubricating film according to claim 1, wherein said organic molecules comprise fluorocarbon groups at the end of said molecules.

3. A lubricating film according to claim 1, wherein the substrate is selected from the group consisting of ceramics, metals, resins, wood, inorganics, papers, fibers, and information recording media.

4. A lubricating film according to claim 1, wherein the substrate is treated to expose its active hydrogens to the surface.

5. A lubricating film according to claim 1, wherein a covalent bond is formed with atoms selected from the group consisting of oxygen, sulfur, nitrogen, silicon, titanium and tin.

6. A lubricating film according to claim 1, wherein said organic molecules comprise side chains.

7. A lubricating film according to claim 1, wherein said organic molecules comprise at least two kinds of molecules.

* * * * *